United States Patent
Willich et al.

(10) Patent No.: US 11,193,863 B2
(45) Date of Patent: Dec. 7, 2021

(54) CONTROL CABINET ARRANGEMENT

(71) Applicant: AVL EMISSION TEST SYSTEMS GMBH, Neuss (DE)

(72) Inventors: Sascha Willich, Korschenbroich (DE); Achim Dickow, Velbert (DE); Sonja Opitz, Duesseldorf (DE); Murat Oeztuerk, Hueckelhoven (DE)

(73) Assignee: AVL EMISSION TEST SYSTEMS GMBH, Neuss (DE)

( * ) Notice: Subject to any disclaimer, the term of this patent is extended or adjusted under 35 U.S.C. 154(b) by 0 days.

(21) Appl. No.: 16/757,770

(22) PCT Filed: Sep. 21, 2018

(86) PCT No.: PCT/EP2018/075581
§ 371 (c)(1),
(2) Date: Apr. 21, 2020

(87) PCT Pub. No.: WO2019/081139
PCT Pub. Date: May 2, 2019

(65) Prior Publication Data
US 2020/0292427 A1 Sep. 17, 2020

(30) Foreign Application Priority Data
Oct. 23, 2017 (DE) .................... 10 2017 124 694.0

(51) Int. Cl.
*G01N 1/44* (2006.01)
*G01N 1/22* (2006.01)
(52) U.S. Cl.
CPC ............. *G01N 1/44* (2013.01); *G01N 1/2252* (2013.01); *G01N 2001/2255* (2013.01)

(58) Field of Classification Search
CPC ................... G01N 1/44; G01N 1/2252; G01N 2001/2255; G01N 2001/2261; G01M 15/10
See application file for complete search history.

(56) References Cited

U.S. PATENT DOCUMENTS 3,960,500 A * 6/1976 Ross .................... G01N 1/2258
422/62
5,821,435 A * 10/1998 Kojima ............... G01M 15/048
73/863.01

(Continued)

FOREIGN PATENT DOCUMENTS

EP 0 959 339 A2 11/1999
EP 2 317 833 A1 5/2011
(Continued)

OTHER PUBLICATIONS

English Machine Translation of Imaki et al., JPH08233738A, Sep. 1996, translated online May 2021 (Year: 1996).*

(Continued)

*Primary Examiner* — David Z Huang
(74) *Attorney, Agent, or Firm* — Norman B. Thot

(57) ABSTRACT

A control cabinet arrangement for an exhaust gas measurement device. The control cabinet arrangement includes a first control cabinet which delimits a first interior space and a second control cabinet which delimits a second interior space. A first heat-generating component of the exhaust emission measurement device is arranged in the first interior space. A second component of the exhaust emission measurement device is arranged in the second interior space. At least one fluidic connection connects the first interior space and the second interior space. The second component is heatable by an air flow flowing between the first interior space and the second interior space.

12 Claims, 1 Drawing Sheet

(56) References Cited

U.S. PATENT DOCUMENTS

| | | | |
|---|---|---|---|
| 7,104,081 B2 * | 9/2006 | Chu | F24F 13/222 |
| | | | 62/259.2 |
| 2001/0045136 A1 | 11/2001 | Hanashiro et al. | |
| 2005/0217299 A1 | 10/2005 | Chu et al. | |
| 2012/0252130 A1 | 10/2012 | Webb et al. | |
| 2014/0250976 A1 | 9/2014 | Miyai | |
| 2014/0338540 A1 | 11/2014 | Yoshimura | |
| 2016/0116373 A1 | 4/2016 | Otsuki | |
| 2019/0031432 A1 | 1/2019 | Dickow | |

FOREIGN PATENT DOCUMENTS

| | | | | |
|---|---|---|---|---|
| JP | H 08-233738 A | | 9/1996 | |
| JP | H08233738 A | * | 9/1996 | G01N 21/61 |
| JP | 10-19744 A | | 1/1998 | |
| JP | 2014-174054 A | | 9/2014 | |
| JP | 2014-224772 A | | 12/2014 | |
| JP | 2016-85217 A | | 5/2016 | |
| KR | 10-2018-0080752 A | | 7/2018 | |
| WO | WO 2017/121552 A1 | | 7/2017 | |

OTHER PUBLICATIONS

Siemens et al: „Siemens PA Jan. 2015 Analytical Application Sets, XP055245324, retrieved from the Internet Jan. 27, 2016: URL: http://www.automation.siemens.com/sc-static/catalogs/catalog/pa/PA01/en/PA01_en_Kap04.pdf, p. 4/8-4/16 (2013).

* cited by examiner

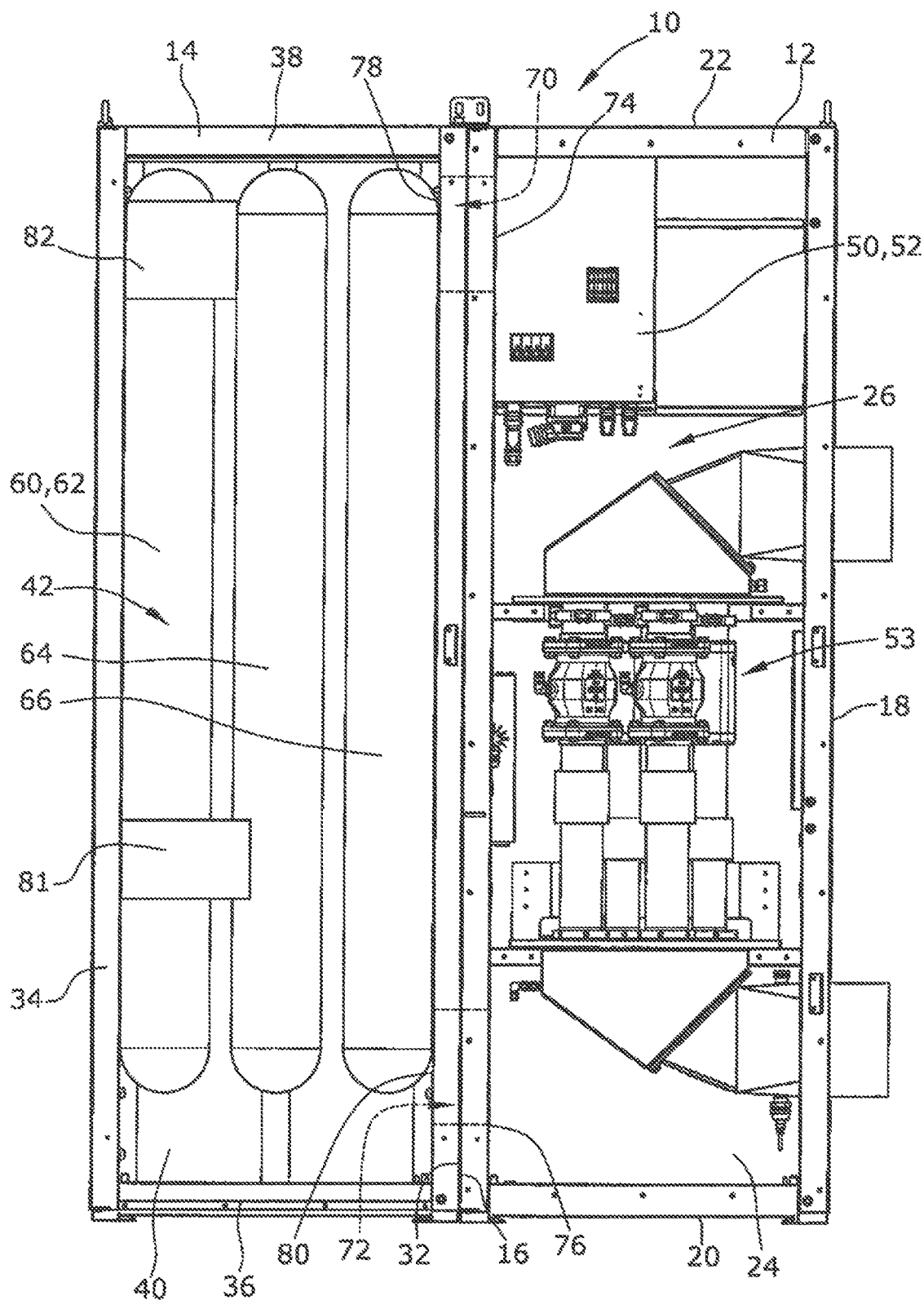

CONTROL CABINET ARRANGEMENT

CROSS REFERENCE TO PRIOR APPLICATIONS

This application is a U.S. National Phase application under 35 U.S.C. § 371 of International Application No. PCT/EP2018/075581, filed on Sep. 21, 2018 and which claims benefit to German Patent Application No. 10 2017 124 694.0, filed on Oct. 23, 2017. The International Application was published in German on May 2, 2019 as WO 2019/081139 A1 under PCT Article 21(2).

FIELD

The present invention relates to a control cabinet arrangement for an exhaust emission measurement device having a first control cabinet, which delimits a first interior space, wherein a first heat-generating component of the exhaust emission measurement device is arranged in the first interior space, and a second control cabinet, which delimits a second interior space, wherein a second component of the exhaust emission measurement device is arranged in the second interior space.

BACKGROUND

Such control cabinets are, for example, used at roller-type dynamometers for the exhaust gas analysis of motor vehicles. A plurality of control cabinets is thereby typically used in which various components of the exhaust gas measurement device are arranged. In a CVS device, for example, a sample collection device with the associated control and electronics is arranged in a first control cabinet, and at least one exhaust gas bag is arranged in a second control cabinet.

In a test cycle of a CVS device, the exhaust gas emitted by a motor vehicle is introduced into a dilution tunnel and is therein diluted with air. The sample gas obtained by the dilution is thereafter collected by sample collection probes and is supplied to one or a plurality of exhaust gas bags. After termination of the driving cycle, the sample gas collected in the exhaust gas bag is analyzed for the proportion of pollutants by a plurality of analysis devices, wherein the proportion of carbon dioxide, carbon monoxide, hydrocarbon, and nitrogen oxide are in particular determined.

Water in the form of water vapor is dissolved in the exhaust gas to be analyzed, which water condenses below a dew point temperature. This condensing of water vapor leads to compromised measuring results and must thus be avoided at all costs in order to provide a reliable and conclusive analysis of the exhaust gas or of the sample gas.

To prevent the water vapor from condensing, the exhaust gas measurement devices typically comprise heating elements which prevent the exhaust gas temperature from falling below the dew point temperature. Such an exhaust gas measurement device is described, for example, in EP 0 59 339 A2. The exhaust gas measurement device comprises a dilution tunnel from which a sample gas composed of exhaust gas and dilution air is collected, the collected sample gas is accumulated in an exhaust gas bag, and the sample gas is subsequently analyzed for the pollutants in the exhaust gas by a plurality of analysis devices. Heating elements are provided at a plurality of locations of the exhaust gas measurement device to prevent the water vapor in the exhaust gas or the sample gas from condensing, via which heating devices the temperature of the exhaust gas flowing into the exhaust gas measurement device, as well as the temperature of the sample gas collected from the dilution tunnel and flowing to the exhaust gas bags, are maintained above the dew point temperature. The exhaust gas bag is arranged in a separate control cabinet, wherein a heater is also arranged in the control cabinet to heat the sample gas accumulated in the exhaust gas bag so that the sample gas contained in the exhaust gas bag is also prevented from condensing.

The configuration described in EP 0 59 339 A2 is disadvantageous in that additional heating elements are used to prevent the water vapor dissolved in the sample gas from condensing, which elements have a high energy consumption and cause an increase in the operating costs of the exhaust gas measurement device.

SUMMARY

An aspect of the present invention is to provide a control cabinet arrangement via which a condensing of water vapor is prevented in an energetically efficient and economic manner.

In an embodiment, the present invention provides a control cabinet arrangement for an exhaust gas measurement device. The control cabinet arrangement includes a first control cabinet which delimits a first interior space and a second control cabinet which delimits a second interior space. A first heat-generating component of the exhaust emission measurement device is arranged in the first interior space. A second component of the exhaust emission measurement device is arranged in the second interior space. At least one fluidic connection connects the first interior space and the second interior space. The second component is heatable by an air flow flowing between the first interior space and the second interior space.

BRIEF DESCRIPTION OF THE DRAWING

The present invention is described in greater detail below on the basis of embodiments and of the drawing in which:

The FIGURE schematically shows a control cabinet arrangement for an exhaust gas measurement device of the present invention.

DETAILED DESCRIPTION

According to the present invention, the first interior space and the second interior space are connected via at least one fluidic connection, wherein the second component may be heated by the air flow flowing between the first interior space and the second interior space. Condensing of the water vapor contained in the exhaust gas is thereby prevented in a simple and efficient manner, wherein the exhaust heat of the heat-generating first component is used to heat the second component. In operation, the first component heats up due to its dissipation loss, wherein the air in the first interior space is heated by the exhaust heat of the heat-generating first component. Due to the fluidic connection between the first interior space and the second interior space, the heated air flows to the second component, thereby heating the second component.

In an embodiment of the present invention, the first control cabinet and the second control cabinet can, for example, be arranged immediately adjacent to each other, wherein one sidewall of the first control cabinet abuts directly against a sidewall of the second control cabinet, and the fluidic connection is formed in the two abutting sidewalls. The fluidic connection can thereby be realized in a simple and economic manner, wherein the fluidic connection is formed by corresponding openings formed in the abutting side parts of the two control cabinets. The thermal transition between the first interior space and the second interior space is also improved in that the thermal transition occurs both via the fluidic connection and by thermal transfer via the abutting sidewalls. Both control cabinets can alternatively be arranged separately and at a distance from each other, wherein the two interior spaces are in fluidic communication via a connecting element forming the at least one fluidic connection.

The first component can, for example, be arranged at the sidewall of the first control cabinet directly adjacent to the second control cabinet, whereby the exhaust heat of the first component is transferred directly to the second interior space via the abutting sidewalls.

A first fluidic connection and a second fluidic connection can, for example, be provided, wherein the air circulates between the first interior space and the second interior space. The heated air here flows from the first interior space into the second interior space via one of the two fluidic connections, and the air cooled down in the second interior space flows back into the first interior space via the first interior space, so that the circulation of air occurs between the two control cabinets. Heat is constantly supplied to the second component in this manner.

In an embodiment of the present invention, the first fluidic connection can, for example, be arranged in the upper portion of the control cabinet, and the second fluidic connection can, for example, be arranged in the lower part of the first control cabinet. A circulation of air is forced without additional components via such an arrangement of the fluidic connections due to the fact that the air heated by the first component rises in the first interior space and flows into the second interior space through the first fluidic connection arranged in the upper part of the control cabinet arrangement. The heat in the heated air is transferred to the second component, whereby the air is cooled and sinks to the bottom in the second interior space. The lower part of the control cabinet arrangement is provided with the second fluidic connection via which the cooled air flows into the first interior space. This process is continuously repeated during the operation of the exhaust gas measurement device.

A blower can, for example, be arranged in the first control cabinet or in the second control cabinet, whereby air circulation between the two interior spaces is assisted and heating the second component is accelerated and improved.

In an embodiment of the present invention, a heating can, for example, be arranged in the first control cabinet or in the second control cabinet. The second component is thereby additionally heated so that water vapor is reliably prevented from condensing even under unusual ambient conditions.

The blower and/or the heating can, for example, be temperature-controlled, wherein a temperature sensor is arranged in the second control cabinet and the heating and/or the blower are activated or deactivated dependent on the temperature of the second interior space. The blower and/or the heating are here activated when the temperature falls below the dew point temperature. The heating and/or the blower can thereby be operated in an energy efficient manner.

In an embodiment of the present invention, the second control cabinet can, for example, be thermally insulated, wherein the interior space of the second control cabinet is at a temperature higher than the ambient temperature. The thermal loss from the second interior space or the second component to the environment is thereby reduced.

The heat-generating first component can, for example, be a voltage supply unit and the second component can, for example, be an exhaust gas bag of an exhaust gas measurement device, wherein the voltage supply unit has a high exhaust heat which is used to prevent the temperature of the sample gas accumulated in the exhaust gas bag from dropping to below the dew point temperature.

A control cabinet arrangement for an exhaust gas measurement device is thus provided by which the water vapor contained in the exhaust gas is prevented from condensing in a simple and energy efficient manner, wherein the exhaust heat of the heat-generating first component is used to heat the second component.

The present invention will be described in greater detail below under reference to an embodiment and to the accompanying drawing.

The FIGURE illustrates a control cabinet arrangement 10 for a CVS device. The control cabinet arrangement 10 is formed by a first control cabinet 12 and a second control cabinet 14.

The first control cabinet 12 has a first sidewall 16, an opposite second sidewall 18, a bottom element 20, a top element 22, and a rear wall 24. A door (which is not illustrated in the FIGURE) is arranged on the side opposite the rear wall 24, via which it is possible to access a first interior space 26 of the first control cabinet 12 when the door is in an open position.

The second control cabinet 14 embodies identically with the first control cabinet 12 so that the second control cabinet 14 has a first sidewall 32, an opposite second sidewall 34, a bottom element 36, a top element 38, and a rear wall 40.

A heat generating first component 50 is arranged in the first interior space 26. The heat generating first component 50 is a voltage supply unit 52 provided for energizing other components of the CVS device, e.g., the flow control device 53 which is also arranged in the first control cabinet 12. The voltage supply unit 52 has a dissipation loss which is dissipated as heat to the air in the first interior space 26.

A second component 60 is arranged in the second interior space 42, wherein the second component 60 is an exhaust gas bag 62. Two further exhaust gas bags 64, 66 are also arranged in the second interior space 42.

The exhaust gas bags 62, 64, 66 are part of the CVS device, wherein, in a CVS device, the exhaust gas emitted by a vehicle and subject to analysis is diluted with air in a dilution channel, the diluted exhaust gas is collected from the dilution channel via a collection probe and is supplied to the exhaust gas bags 62, 64, 66. The exhaust gas emitted during the driving cycle is then analyzed for the proportion of pollutants by a plurality of analysis devices.

Water in the form of water vapor is dissolved in the exhaust gas to be analyzed, the water condensing below a dew point temperature. This condensing of the water vapor results in compromised measuring results and must be avoided at all costs in order to provide a reliable and conclusive analysis of the exhaust gas. To avoid condensing, heat is supplied to the exhaust gas bags 62, 74, 66 in order to keep the temperature of the sample gas accumulated in the exhaust gas bags 62, 64, 66 above the dew point temperature.

According to the present invention, the first interior space 26 and the second interior space 42 are in communication via a first fluidic connection 70 and a second fluidic connection 72. The first sidewall 16 of the first control cabinet 12 here has a first opening 74 for the first fluidic connection 70 and a second opening 76 for the second fluidic connection 72. The first sidewall 32 of the second control cabinet 14 also has a first opening 78 for the first fluidic connection 70 and a second opening 80 for the second fluidic connection 42. Due to the fact that the first sidewall 16 of the first control cabinet 12 and the first sidewall 32 of the second control cabinet 14 directly abut against each other, the corresponding first openings 74, 78 form the first fluidic connection 70, and the corresponding second openings 76, 80 form the second fluidic connection 72.

The first sidewall 16 of the first control cabinet 12 and the first sidewall 32 of the second sidewall 14 can alternatively be integrally formed. In addition thereto, in an alternative embodiment of the control cabinet arrangement 10, the rear wall 24 of the first control cabinet 12 and the rear wall 40 of the second control cabinet 14 can abut against each other, wherein the openings for the fluidic connections 70, 72 are formed in the two rear walls 24, 40.

The first fluidic connection 70 is arranged in the upper part of the two control cabinets 12, 14, and the second fluidic connection 72 is arranged in the lower part. Air circulates between the two interior spaces 26, 42 with such an arrangement of the two fluidic connections 70, 72. The air in the first interior space 26 is here heated by the exhaust heat of the voltage supply unit 52 and rises upward in the first interior space 26. Due to the first fluidic connection 70 arranged in the upper part of the control cabinet arrangement 10, the heated air flows into the second interior space 42. In the second interior space 42, a thermal transfer occurs from the air to the exhaust gas bags 62, 64, 66, whereby the air is cooled and sinks downward. In the lower part, the cooled air flows from the second interior space 42 into the first interior space 26. A continuous circulation of air thereby occurs between the two interior spaces 26, 42, whereby hot air is continuously supplied into the second interior space 42. To increase the circulation of air between the two interior spaces 26, 42, a blower 81 is arranged in the second control cabinet 14. A further temperature-controlled blower (which is not illustrated in the FIGURE) can additionally be arranged in one of the control cabinets, which further temperature-controlled blower is arranged immediately at the first fluidic connection 70 and is operated dependent on the temperature of the first component 50.

A heater 82 is furthermore arranged in the second control cabinet 14, and the second control cabinet 14 is thermally insulated so that the temperature of the sample gas contained in the exhaust gas bags 62, 64, 66 is maintained above the dew point temperature even at low ambient temperatures.

A control cabinet arrangement 10 for an exhaust gas measurement device is thus provided via which water vapor contained in the sample gas is prevented from condensing in a simple and energy efficient manner, wherein the exhaust heat of the heat-generating first component 50 is used to heat the second component 60 and to prevent the water vapor contained in the sample gas from condensing.

It should be clear that the scope of protection of the present invention is not limited to the described embodiment of the control cabinet arrangement. Such a control cabinet arrangement can be used in various exhaust gas measurement devices, wherein different components of the exhaust gas measurement device can be arranged in the control cabinets. Reference should also be had to the appended claims.

What is claimed is:

1. A control cabinet arrangement for an exhaust gas emission device, the control cabinet arrangement comprising:
   a first control cabinet which delimits a first interior space, a first heat-generating component of the exhaust emission measurement device being arranged in the first interior space;
   a second control cabinet which delimits a second interior space, a second component of the exhaust emission measurement device being arranged in the second interior space; and
   at least one fluidic connection which connects the first interior space and the second interior space,
   wherein,
   the second component is heatable by an air flow flowing between the first interior space and the second interior space.

2. The control cabinet arrangement as recited in claim 1, wherein,
   the first control cabinet and the second control cabinet are arranged immediately adjacent one another,
   the first control cabinet comprises a first control cabinet sidewall,
   the second control cabinet comprises a second control cabinet sidewall,
   the first control cabinet sidewall directly abuts against the second control cabinet sidewall, and
   the at least one fluidic connection is formed in the first control cabinet sidewall and in the second control cabinet sidewall.

3. The control cabinet arrangement as recited in claim 2, wherein the first heat-generating component is arranged at the first control cabinet sidewall immediately adjacent to the second control cabinet.

4. The control cabinet arrangement as recited in claim 1, wherein,
   the first control cabinet and the second control cabinet are arranged separately and at a distance from each other, and
   the first interior space and the second interior space are in fluid communication with each other via a connecting element which forms the at least one fluidic connection.

5. The control cabinet arrangement as recited in claim 1, wherein the at least one fluidic connection comprises a first fluidic connection and a second fluidic connection which is arranged so that air circulates between the first interior space and the second interior space.

6. The control cabinet arrangement as recited in claim 5, wherein,
   the first fluidic connection is arranged in an upper part of the first control cabinet and the second control cabinet, and
   the second fluidic connection is arranged in a lower part of the first control cabinet and the second control cabinet.

7. The control cabinet arrangement as recited in claim 1, further comprising:
   a blower arranged in the first control cabinet or in the second control cabinet.

8. The control cabinet arrangement as recited in claim 7, wherein the blower is a temperature-controlled blower.

9. The control cabinet arrangement as recited in claim 1, further comprising:
   a heater arranged in the first control cabinet or in the second control cabinet.

10. The control cabinet arrangement as recited in claim 9, wherein the heater is a temperature-controlled heater.

11. The control cabinet arrangement as recited in claim 1, wherein,
    the second control cabinet is thermally insulated, and the second interior space of the second control cabinet has a temperature which is higher than an ambient temperature.

12. The control cabinet arrangement as recited in claim 1, wherein, the first heat-generating component is a voltage supply unit, and the second component is an exhaust gas bag of an exhaust gas measurement device.

\* \* \* \* \*